United States Patent [19]

Lee et al.

[11] Patent Number: 5,544,351
[45] Date of Patent: Aug. 6, 1996

[54] DIGITAL SIGNAL PROCESSING SYSTEM UTILIZING RELATIVELY SLOWER SPEED MEMORY

[75] Inventors: Bangwon Lee, Kwangmyung; Donghoi Kim, Bucheon, both of Rep. of Korea

[73] Assignee: Samsung Electronics Co., Ltd., Kyungki-do, Rep. of Korea

[21] Appl. No.: 123,968

[22] Filed: Sep. 21, 1993

[30] Foreign Application Priority Data

Sep. 21, 1992 [KR] Rep. of Korea ............... 1992-17211

[51] Int. Cl.$^6$ .................................. G06F 12/00
[52] U.S. Cl. ............... 395/550; 395/405; 395/421.01; 364/DIG. 1
[58] Field of Search ............... 395/405, 421.01, 395/550

[56] References Cited

U.S. PATENT DOCUMENTS 4,415,991  11/1983  Chu et al. .................................. 365/77

Primary Examiner—Thomas M. Heckler

[57] ABSTRACT

A digital signal processing system of the present invention enables a high speed digital signal processor (DSP) to run at full speed, despite accessing data stored in a number of relatively slower memory modules. The system demultiplexes a high speed address bus into parallel lower-speed address buses for each of several relatively slower memory modules. The use of address demultiplexing allows for use of low speed memory, while providing for the full capabilities of a high speed DSP. The data from the memory modules is multiplexed into a single high-speed data bus, and read by the DSP. A write operation is also possible by the addition of an additional demultiplexer in the data bus.

14 Claims, 6 Drawing Sheets

DIGITAL SIGNAL PROCESSING SYSTEM UTILIZING RELATIVELY SLOWER SPEED MEMORY

FIELD OF THE INVENTION

The present invention relates to a digital signal processing system, and more particularly to a memory architecture whereby memory chips which have a slower access time than the DSP can be used without delaying the DSP.

BACKGROUND OF THE INVENTION

Conventional digital signal processing systems include a digital signal processor (DSP) and memory modules matched to the speed performance of the DSP. The performance of a high speed DSP system is often limited by the speed of available or affordable memory modules. Available or affordable memory access time is often slower than that of the DSP addressing cycle, thereby setting the maximum speed of the DSP system at the maximum speed of the memory modules. This wastes available processing time (and thereby much of the power) of the DSP.

Conventional high speed memory modules are also very expensive and consume large amounts of electrical power. Often times memory modules are not commercially available to suit the needs of high speed digital signal processing systems.

The conventional DSP system contains a DSP with a single address and data bus and an appropriately sized memory module accessed directly over the DSP address and data bus. Since often times the speed of the memory is the limiting performance factor of a digital signal processing system, the DSP must typically be "held" in place during a memory access until the memory "catches up". This is lost processing time resulting in reduced performance of the DSP system.

For instance, in a system in which a DSP has a 20 nano-second memory access cycle, but the memory is much slower, having a 100 nano-second access time, the DSP memory access cycle must be delayed at least 80 nanoseconds before the DSP can properly access the memory. This results in an 80 percent reduction in the efficiency of memory access.

Conventional uses of digital signal processing systems include real time processing, which requires an enormous amount of processing power from a digital signal processing system. This is usually provided by an as-fast-as-possible DSP, which ideally uses memory that is as fast (or faster) than the DSP memory access cycle. A DSP system that meets these requirements is difficult and expensive to achieve, and is often limited by the fastest available memory.

The conventional solution to real time processing and other high power digital signal processing needs are the use of parallel DSP's, requiring a plurality of DSP's and therefore a multiplicity of high speed memory.

SUMMARY OF THE INVENTION

One object of the invention is to provide an improved digital signal processing system which allows a single DSP to simultaneously access a plurality of memory connected in parallel.

Another object of the invention is to provide a high speed DSP system which operates at full speed yet uses slower speed memory modules.

To achieve these and other objects, a digital signal processing system is disclosed which includes a high speed DSP and a number of relatively slower memory modules connected in parallel with the DSP. This invention also includes demultiplexers for demultiplexing the sequentially produced addresses and data from the DSP into simultaneous parallel addresses and data to the memory modules. This invention also includes a multiplexer for multiplexing the data output from the parallel memory modules into a single data bus to the DSP.

According to a preferred embodiment of the present invention, the DSP, the demultiplexers and the multiplexer are synchronized by a system clock, making it possible for the high speed DSP to effectively access a plurality of slower speed memory in a time-sharing, pipeline fashion. As a result, a digital signal processing system which runs at full speed yet uses relatively slower speed memory is made possible.

Additional objects and advantages of the invention will be set forth, or be obvious from, or may be learned from, the description to follow.

DESCRIPTION OF THE PREFERRED EMBODIMENT

Detailed reference will now be made to the present preferred embodiment of the invention, an example of which is illustrated in the accompanying drawings.

Figure 1:
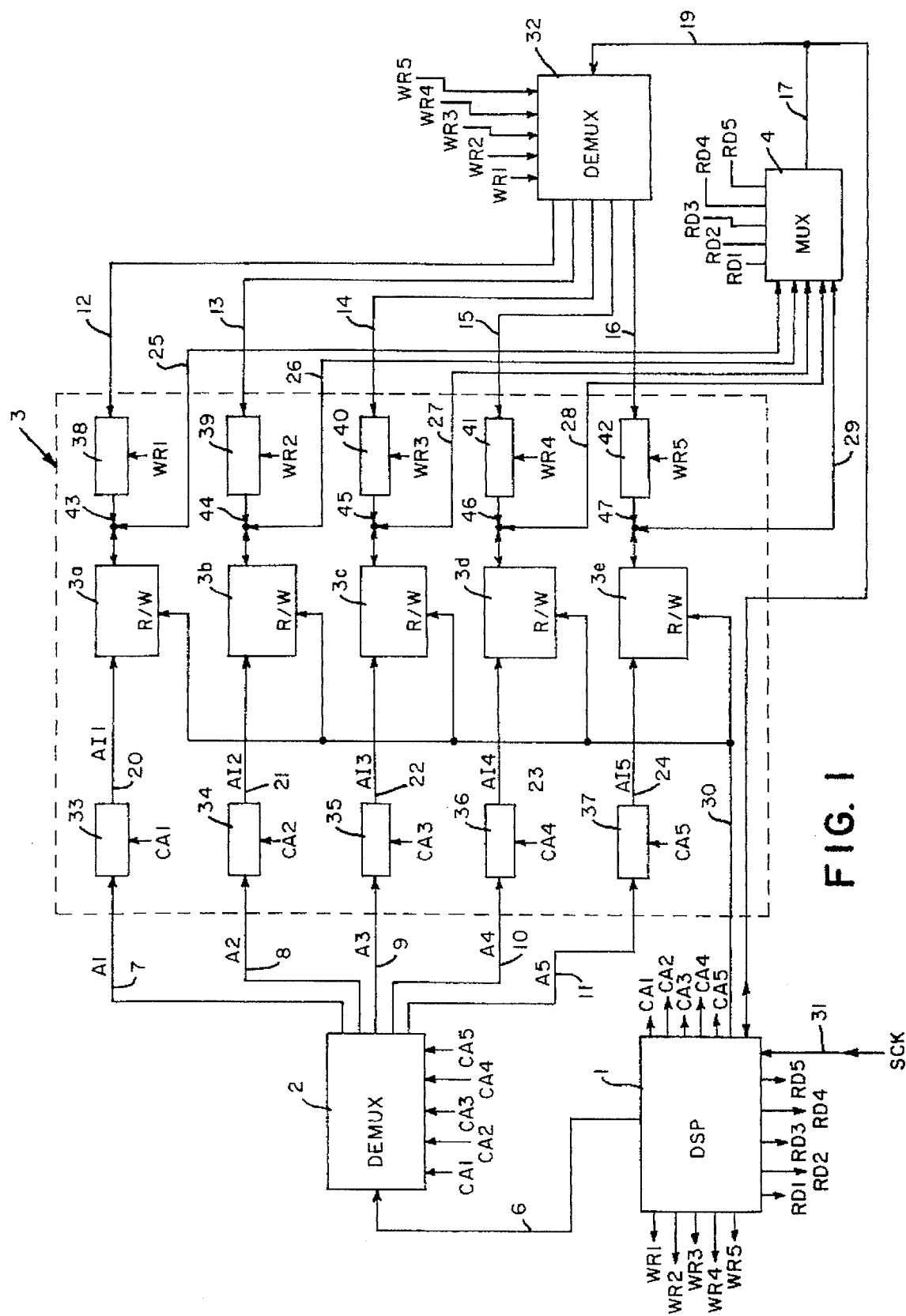
FIG. 1 is a block diagram of a digital system processing system in accordance with an embodiment of this invention.

FIG. 1 shows a digital signal processing system in which five slower memory modules 3a–3e contained in memory block 3 are accessed by a single high speed digital signal processor (DSP) 1. The DSP 1 sequentially and continuously generates address signals A1, A2, A3, A4, A5, A1, A2, etc. over a single n-bit address bus 6. Each of the address signals A1–A5 on the address bus 6 remain valid for an individual period of the system clock SCK.

The address bus 6 is presented to the input of the demultiplexer 2, which is synchronized to the system clock SCK and controlled by signals CA1–CA5 generated by the DSP 1 during all read and write operations.

The demultiplexer 2 includes a sufficient number of address lines to uniquely designate each of the memory modules being accessed. The address bus 6, containing sequential address signals A1–A5, is demultiplexed by the data demultiplexer (DEMUX) 2 into individual n-bit address busses 7–11, each respectively receiving one of the address signals A1–A5.

The address signals on address busses 7–11 are then latched into address latches 33–37, respectively. The address latches 33–37 are synchronized to the SCK 31 signal through the signals CA1-CA5 from the DSP 1. These signals may, of course, be generated outside the DSP, such as in a programmable array logic (PAL) or similar device. The n-bit outputs 20–24 of the address latches 33–37 maintain a valid address signal to the memory modules 3a–3e long enough so that the memory has enough time to respond. In this example, the address latches 33–37 maintain a valid address for five periods of the SCK 31.

The read and write control to the memory modules 3a–3e are synchronized to the system clock SCK 31, and derive from the DSP read/write signals. The read/write timing 30 may reside inside the DSP, as in this example, or it may be derived external to the DSP in a device such as a programmable array logic (PAL), gate array logic (GAL) or similar device.

The memory modules 3a–3e are capable of read and write operations. Therefore, this invention applies to DSP memory architectures for program memory or data memory. Memory modules 3a–3e may be Random Access Memory (RAM), Read Only Memory (ROM), or any other memory devices which are capable of at least outputting data.

In a read operation of the DSP 1, the data that corresponds to the valid addresses on the address buses 20–24 propagates from the memory modules 3a–3e and is output on the data output buses 25–29.

The data on data buses 25–29 is input to the multiplexer (MUX) 4. The MUX 4 is synchronized to the system clock SCK 31 and controlled by the DSP 1 through signals RD1–RD5. The MUX 4 multiplexes the data present on data buses 25–29 into a single higher speed data bus 17. The data rate of the data bus 17 is the speed of the system clock SCK. With the five memory modules 3a–3e of this embodiment, the data rate of data buses 25–29 is five times slower than that of data bus 17.

The data present on the data bus 17 is then read by the DSP 1 on the DSP data bus. The data which is read by the DSP is offset in time from when the DSP addressed the data, however this offset is easily accommodated by proper programming of the DSP.

During a read operation, the outputs of the data latches 38–42 remain in a high impedance state.

The addressing of the memory modules 3a–3e operates during a write operation of the DSP in an identical fashion as that of the read operation described above. During the write operation, the data to be written into the memory modules 3a–3e is input to the memory modules 3a–3e through the data demultiplexer (DEMUX) 32 and data latches 38–42. The data is output from the DSP 1 on the data bus 19. The data DEMUX 32 is synchronized to the system clock SCK and is controlled by the signals WR1–WR5. The DSP 1 creates the signals WR1–WR5, which also control the data latches 38–42.

The data DEMUX 32 operates in a similar fashion as the address DEMUX 2, however the data DEMUX 32 demultiplexes the data from data bus 19.

The demultiplexed data from the data DEMUX 32 is latched into the data latches 38–42 through data buses 12–16. The data latches 38–42 are synchronized to the system clock SCK 31 through the DSP 1 and are controlled by the signals WR1–WR5. The latches are latched with signals WR1 through WR5. Signals WR1 through WR5 are derived from the write timing of the DSP 1, and may be created inside or external to the DSP 1.

The data latches 38–42 maintain the validity of the data on data buses 43–47 for five periods of the system clock SCK 31, so that the memory modules 3a–3e have sufficient time to store the data.

The required number of memory modules is determined from dividing the memory access time of the memory module by the memory cycle time of the DSP, which in this embodiment is one period of the system clock SCK. For example, memory block 3 of the illustrated embodiment consists of five memory modules 3a–3e. This was determined from the memory module access time of 100 nanoseconds, and from the DSP memory cycle of 20 nanoseconds.

The address buses 6, 7–11, and 20–24 are to be understood as containing a plurality of individual address lines, as determined by the size of the memory module. Of course, the number of available address lines are limited by addressing capability of the DSP 1. The data buses 17, 19, 12–16, 25–29, and 43–47 are to be likewise understood as containing a plurality of data lines, usually in multiples of eight.

Figure 2:
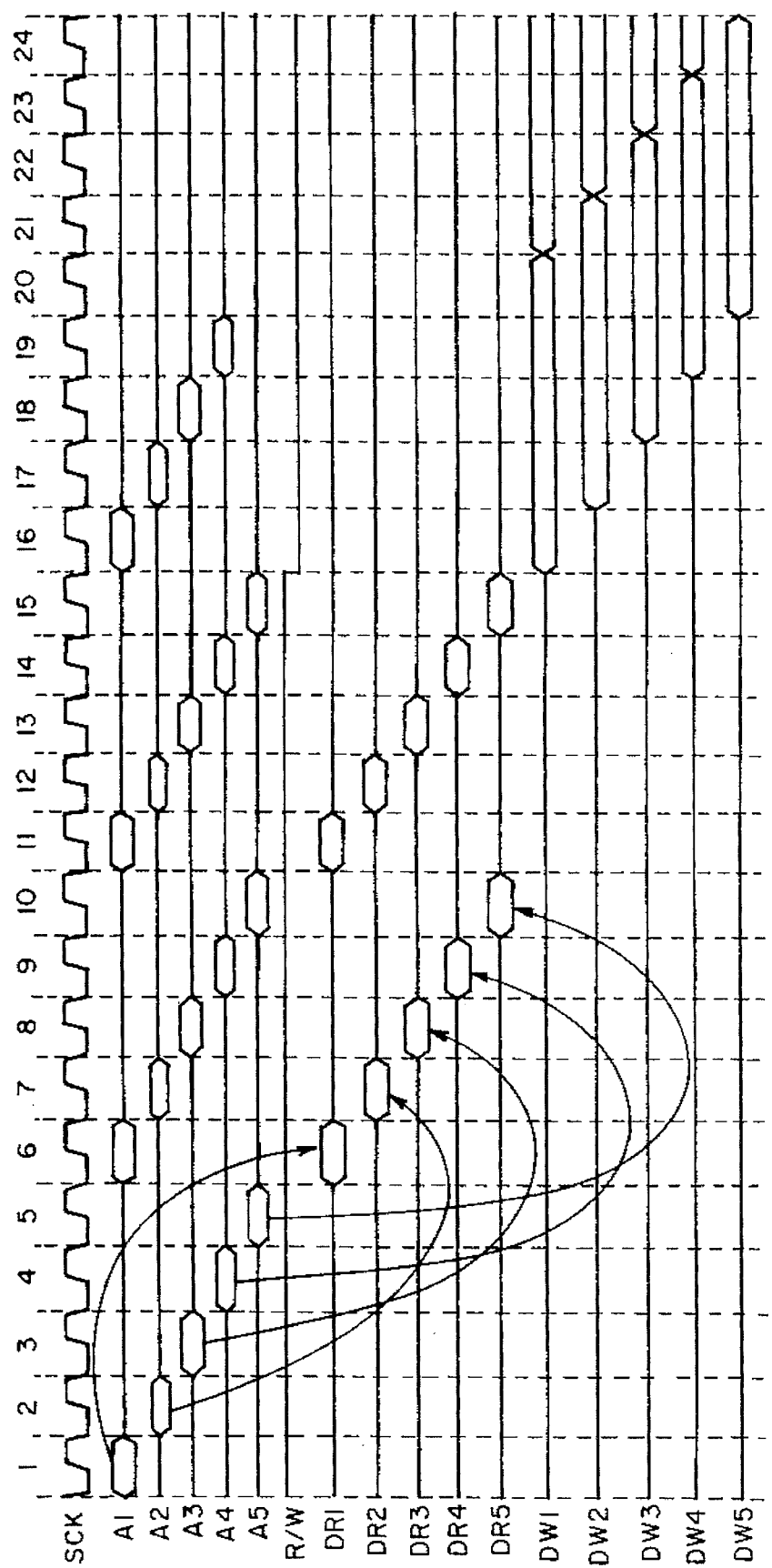
FIG. 2 shows timing waveforms of an embodiment of this invention.

FIG. 2 shows timing waveforms of the memory read and write cycles for 10 read cycles and 9 write cycles of the DSP. Address bus A1 is shown to contain valid addresses during the 1st, 6th, 11th and 16th periods of SCK. Address bus A2 has valid data during the 2nd, 7th, 12th, etc. Address buses A3–A5 contain similar valid addresses offset by a single period of the system clock, respectively.

The valid addresses of the address buses A1–A5 are latched into the address latches 33–37 when they occur, as described above. These latched addresses are not shown in FIG. 2.

In the first read cycle of the DSP, A1 is valid during the 1st cycle of SCK. Address A1 is then latched and held as an input to memory module 3a. The data DR1 from memory module 3a then propagates out over data bus 25 to the MUX 4. MUX 4 then multiplexes the data, along with the data from the other memory modules 3b–3e, onto data bus 17, and the data is finally input to the DSP 1 as data in the sixth period of the SCK. This timing is similar for addresses A2–A5 on address buses 8–11, resulting in valid data DR2–DR5 on data buses 25–29 (DR2–DR5) at the times shown. The valid addresses cycle around after five cycles of the system clock SCK. Ten read access cycles are shown in FIG. 2.

Write cycles are shown being initiated in FIG. 2 in SCK periods 11 through 19 on address buses 7–11 (A1–A5). The resulting data on data buses 25–29 (DR1–DR5) is shown in periods 16–24. Address bus 7 (A1) contains a valid address for a write operation in the 11th period of SCK. The data bus 25 (DW1) contains data corresponding to that address access (after propagating through the memory module 3a) beginning at SCK period 16. Note that the data output from the memory modules 3a–3e remains valid for five periods of SCK. This is because the address is latched into the address latches 33–37.

Figure 3:
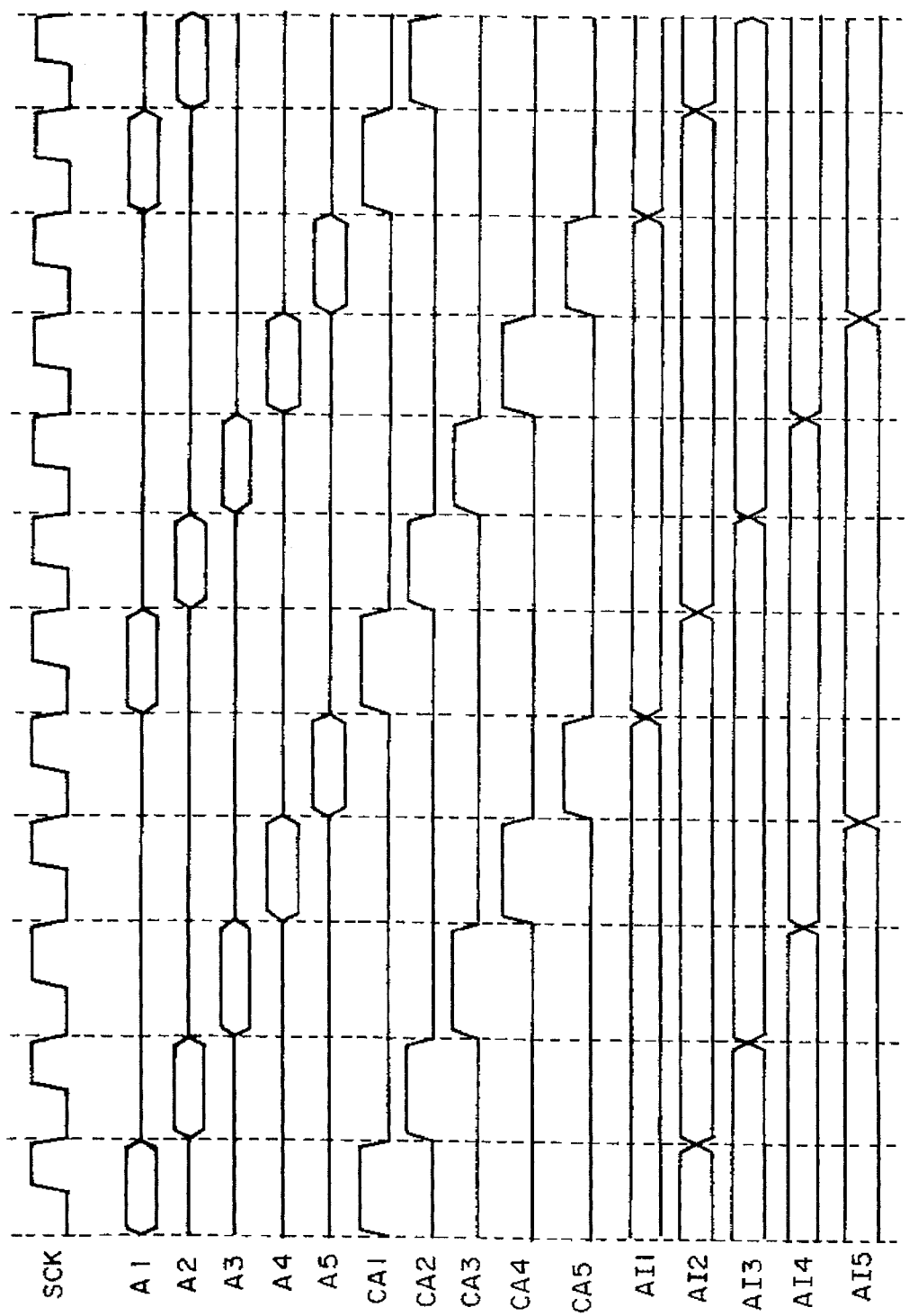
FIG. 3 shows timing waveforms of address generation of an embodiment of this invention.

FIG. 3 shows the timing of address latch control signals CA1–CA5. A latch, such as those used for the address latches 33–37, in the unlatched state allows the data present on the input to be echoed to the latch output. As the signals at the latch input change, so do the signals at the latch output. In a latched state, the outputs of the latch retain the data which was last present at the output before the latch control signal caused the latched condition.

The address latches 33–37 of this embodiment are unlatched when the control signal is at a high logic level, and are in a latched state when the control signal is at a low logic level. It can be seen from the high logic level of the latch signals CA1–CA5 during the time that the respective address is valid that the address latches 33–37 are in an unlatched state when the address is valid, and then are latched, thereby retaining the last address, until the next address arrives five periods of the system clock SCK later. The timing of the outputs 20–24 of the address latches 33–37 is shown as signals AI1–AI5.

Figure 4:
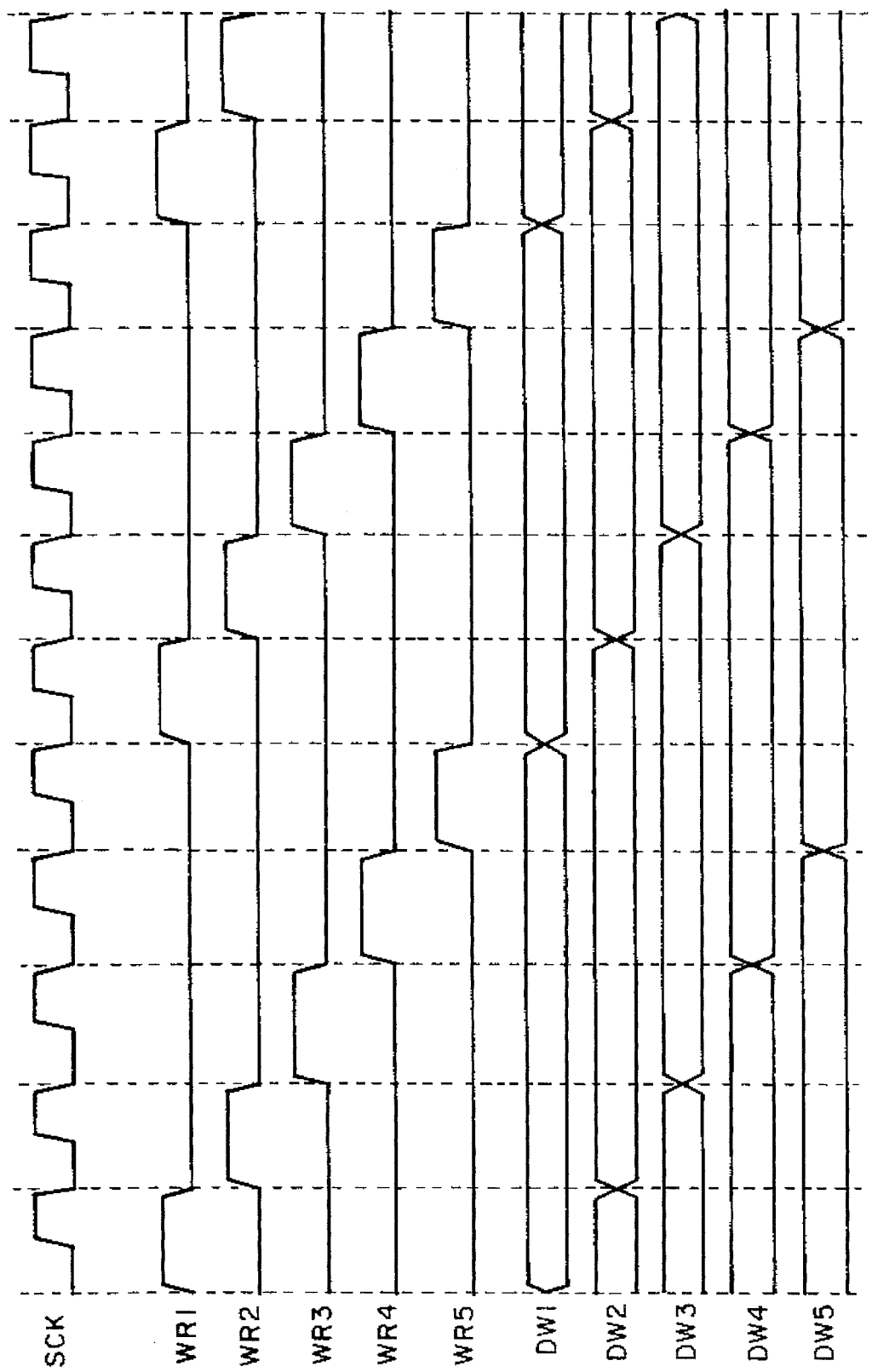
FIG. 4 shows timing waveforms of memory write cycles of an embodiment of this invention.

FIG. 4 shows the timing of the signals associated with a write cycle. The control signals WR1–WR5 to the data latches 38–42 are similar to signals CA1–CA5 described above, however they latch the data on data buses 12–16.

Data is written by the DSP 1 on its data bus 19. This data is input to the data DEMUX 32 for demultiplexing into the individual data buses 12–16 and is then input to the data latches 38–42. The data latches 38–42 then latch the data in response to data latch signals WR1–WR5. The latched valid data on output buses 43–47 are shown in FIG. 4 as DW1–DW5. As is evident from the timing of DW1–DW5, the data is valid as input to the memory modules 3a–3e for a sufficient amount of time—typically multiple system clock cycles. In this example, the sufficient amount of time is five periods of the system clock SCK, enabling the relatively slower memory modules 3a–3e time to store the data.

Figure 5:
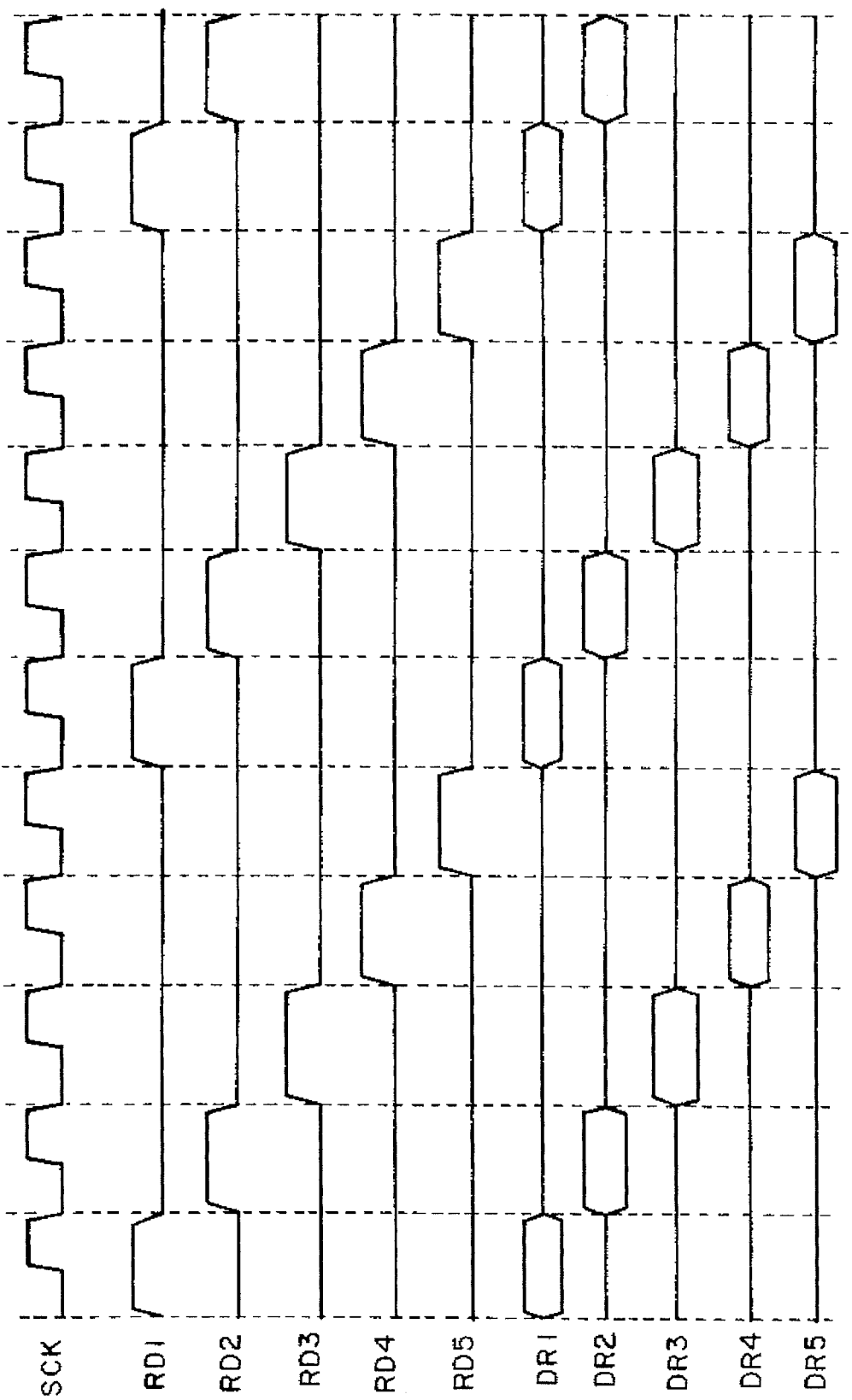
FIG. 5 shows timing waveforms of memory read cycles of an embodiment of this invention.

FIG. 5 shows the timing of the signals associated with a read cycle. During the read cycles, the outputs of the data latches 38–42 remain in a high impedance state, so as not to interfere with the data buses 25–29. The signals RD1–RD5 correspond to control signals into the MUX 4. The signals DR1–DR5 depict the valid periods of the data being presented to the DSP 1 on data bus 17. No data latching is necessary for a read operation.

Figure 6:
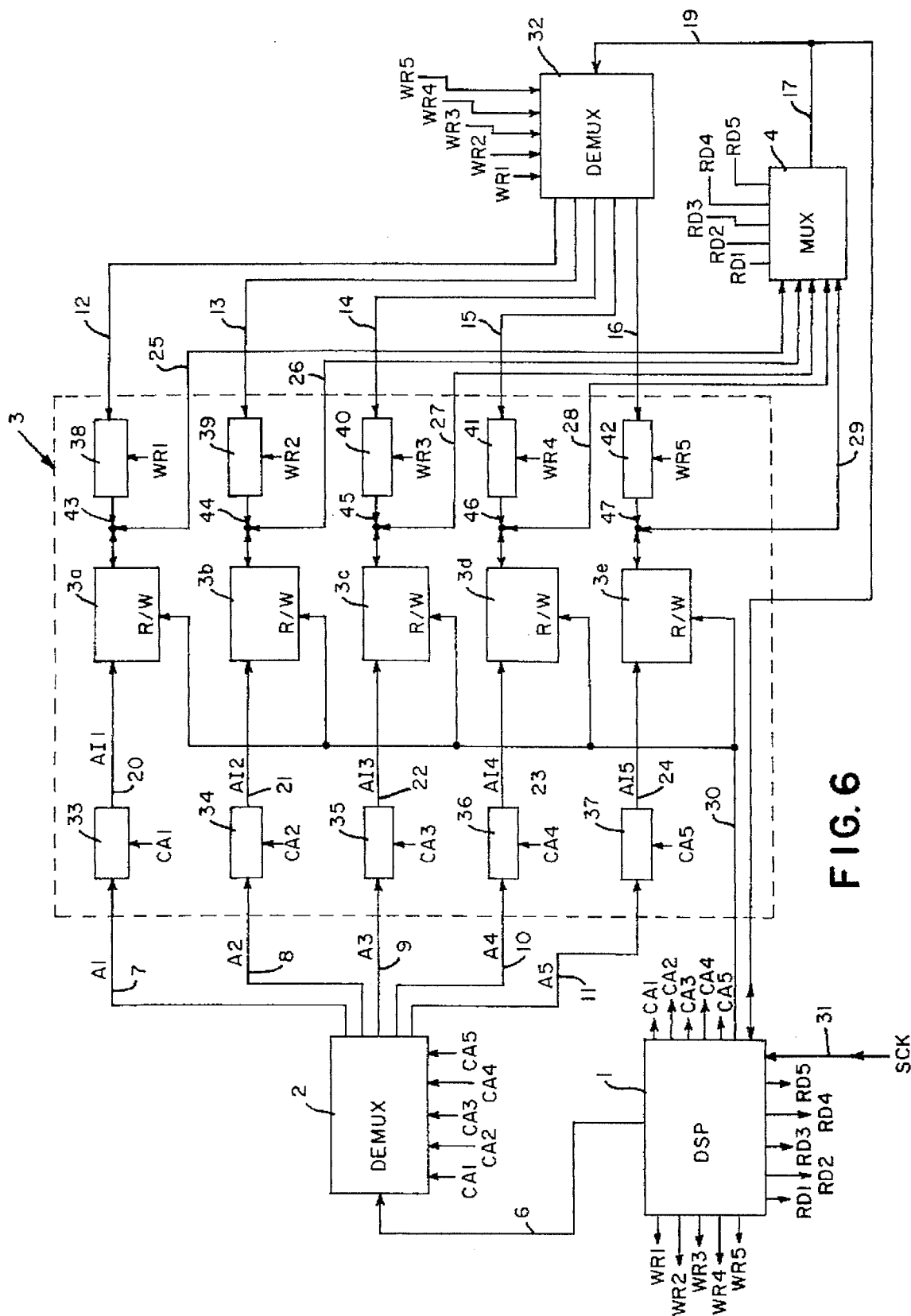
FIG. 6 shows a block diagram of a second digital system processing system in accordance with an embodiment of this invention.

FIG. 6 shows an alternate embodiment of the present invention. The functionality of the embodiment is identical to the preferred embodiment described above, however the memory modules 3a–3e have two data ports. The data to be written to the memory modules is presented on write data buses 43–47, while the data to be read from the memory modules 3a–3e is passed to the MUX 4 over the read data buses 25–29.

According to the present invention, information in relatively slow speed memory can be efficiently accessed and stored by a high speed DSP by using a plurality of memory connected to the DSP in a parallel fashion. It is therefore possible to gain full use of a high speed digital processing system, despite the slower speed of the memory. This allows the avoidance of the expense and the unavailability of higher speed memory.

Therefore, according to the present invention, it is possible to use memory modules which have access times which are much longer than those of the DSP, and this relatively slow memory can be used in a high speed digital processing system—without any loss of processing time.

What is claimed is:

1. A digital signal processing system comprising:

a digital signal processor having a high-speed address bus and a high-speed data bus, said digital signal processor generating a series of memory addresses on the high-speed address bus at a first rate, each address valid for a first period;

an address demultiplexer receiving the memory address series and switching each individual address to one of a series of low-speed address buses, said low-speed address buses having a lower speed than said high-speed address bus;

a plurality of address latches, each connected to one low speed address bus, each holding one address for a period exceeding the first period;

a plurality of memory modules, each memory module having an address port connected to an address latch, each memory module having a data port connected to one of a plurality of low speed data buses, said low-speed data buses having a lower speed than said high-speed data bus, each memory module having an access time greater than the first period; and a data multiplexer receiving data from the plurality of low speed data buses and multiplexing data from said memory modules onto said high-speed data bus.

2. The digital signal processing system according to claim 1, further comprising:

a data demultiplexer receiving a series of data blocks from the high speed data bus, each data block valid for a second period that is less than the module access time; and a plurality of data latches, each connected to one of the low-speed data buses, each data latch holding one data block for a period exceeding the second period.

3. The digital signal processing system according to claim 2, wherein the address demultiplexer and the data multiplexer are synchronized to one another and to the digital signal processor.

4. The digital signal processing system according to claim 2, wherein said digital signal processor generates control signals for said data demultiplexer.

5. The digital signal processing system according to claim 1, wherein the number of said plurality of memory modules is approximately the ratio of the memory module access time to first period.

6. The digital signal processing system according to claim 1, wherein said digital signal processor generates control signals for said address demultiplexer.

7. The digital signal processing system according to claim 1, wherein said digital signal processor generates control signals for said data multiplexer.

8. A digital signal processing system comprising:

a digital signal processor having a high-speed address bus and a high-speed data bus, said digital signal processor generating a series of memory addresses on said high-speed address bus at a first rate, each address valid for a first time period;

address demultiplexer means for demultiplexing said memory address series onto a plurality of low-speed address buses, said low-speed address buses having a lower speed than said high-speed address bus;

address latch means for latching each of said low-speed address buses for a time period greater than said first time period;

memory means having as outputs a plurality of low-speed data buses, said low-speed data buses having a lower speed than said high-speed data bus, a data on said memory means output being responsive to an address output from said address latch means, said memory means having an access time greater than said first time period; and data multiplexer means for multiplexing data from said memory means onto said high-speed data bus.

9. The digital signal processing system according to claim 8, further comprising:

data demultiplexer means for receiving a series of data on said high-speed data bus, each data on said high-speed data bus being valid for a second time period that is less than said memory module access time, said data demultiplexer means demultiplexing said high-speed data bus into a plurality of low-speed data buses as output; and data latch means, having said low-speed data bus as an input and having an output connected to said memory module data port, for holding one data block valid on said output for a time period exceeding said second time period.

10. The digital signal processing system according to claim 9, wherein said address demultiplexer means and said data multiplexer means are synchronized to one another and to said digital signal processor.

11. The digital signal processing system according to claim 9, wherein said digital signal processor generates control signals for said data demultiplexer means.

12. The digital signal processing system according to claim 8, wherein said memory means comprises the number of memory modules approximately equal to a ratio of the memory module access time to said first time period.

13. The digital signal processing system according to claim 8, wherein said digital signal processor generates control signals for said address demultiplexer means.

14. The digital signal processing system according to claim 8, wherein said digital signal processor generates control signals for said data multiplexer means.

* * * * *